United States Patent
Sukegawa et al.

(10) Patent No.: US 9,235,751 B2
(45) Date of Patent: Jan. 12, 2016

(54) METHOD AND APPARATUS FOR IMAGE DETECTION AND CORRECTION

(71) Applicant: Kabushiki Kaisha Toshiba, Tokyo (JP)

(72) Inventors: Hiroshi Sukegawa, Kanagawa (JP); Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 228 days.

(21) Appl. No.: 13/804,486

(22) Filed: Mar. 14, 2013

(65) Prior Publication Data
US 2013/0243274 A1    Sep. 19, 2013

(30) Foreign Application Priority Data
Mar. 15, 2012    (JP) .................................. 2012-059212

(51) Int. Cl.
G06K 9/62      (2006.01)
G06K 9/00      (2006.01)

(52) U.S. Cl.
CPC ........ *G06K 9/00275* (2013.01); *G06K 9/00221* (2013.01); *G06K 9/00771* (2013.01)

(58) Field of Classification Search
None
See application file for complete search history.

(56) References Cited

U.S. PATENT DOCUMENTS

2008/0175509 A1* 7/2008 Wheeler et al. ............... 382/260
2008/0267458 A1* 10/2008 Laganiere et al. ............ 382/118

FOREIGN PATENT DOCUMENTS

| JP | 2006-350498 |   | 12/2006 |
| JP | 2008-181520 |   | 8/2008  |
| JP | 2009-205283 |   | 9/2009  |
| JP | 2010-272109 |   | 12/2010 |
| JP | 2011-210118 | A | 10/2011 |
| JP | 2012-043151 | A | 3/2012  |

OTHER PUBLICATIONS

Office Action issued in related Korean Patent Application No. 10-2013-0027372 mailed May 27, 2014, 4 pages.

\* cited by examiner

*Primary Examiner* — Brian P Werner
(74) *Attorney, Agent, or Firm* — Baker Botts L.L.P.

(57) ABSTRACT

According to one embodiment, a person image processing apparatus includes: an input processor configured to input a plurality of pieces of image data captured at different times by an image capture module; an extraction module configured to extract a person display area showing a same person from each of the pieces of image data captured at the different times; a feature detector configured to detect a feature point showing a feature of a part of a person from the person display area extracted from each of the pieces of image data and acquire reliability of the part shown in the feature point; and a correction module configured to, when correcting the person display area subjected to input processing by the input processor, perform weighting based on the reliability of the feature point included in the person display area.

10 Claims, 13 Drawing Sheets

| FRAME | INDEX | FACE FEATURE POINT 1 | | | FACE FEATURE POINT 2 | | | ... | FACE FEATURE POINT N | | |
|---|---|---|---|---|---|---|---|---|---|---|---|
| | | X | Y | RELIA-BILITY | X | Y | RELIA-BILITY | | X | Y | RELIA-BILITY |
| 1 | 1 | 140 | 20 | 0.90 | 320 | 21 | 0.94 | ... | 200 | 40 | 0.92 |
| 2 | 1 | 138 | 25 | 0.92 | 324 | 26 | 0.95 | ... | 202 | 45 | 0.97 |
| 2 | 2 | 240 | 20 | 0.90 | 420 | 21 | 0.54 | ... | 300 | 40 | 0.92 |
| 3 | 1 | 137 | 45 | 0.94 | 320 | 46 | 0.96 | ... | 200 | 62 | 0.98 |
| 3 | 2 | 238 | 20 | 0.94 | 422 | 21 | 0.56 | ... | 200 | 42 | 0.95 |
| | | | | | | | ... | | | | |

*FIG. 8*

METHOD AND APPARATUS FOR IMAGE DETECTION AND CORRECTION

CROSS-REFERENCE TO RELATED APPLICATIONS

This application is based upon and claims the benefit of priority from Japanese Patent Application No. 2012-059212, filed Mar. 15, 2012, the entire contents of which are incorporated herein by reference.

FIELD

Embodiments described herein relate generally to a person image processing apparatus and a person image processing method.

BACKGROUND

Conventionally, image data captured by a security camera at an event has been visually checked. This has evoked a demand for acquiring image data that is easy to be visually checked.

For this purpose, techniques have been developed that improve resolution of a plurality of pieces of image data of the same person using the AAM, active shape models, the amount of motion, or the like.

Relating to that, a technology has been developed that changes parameters to improve resolution in accordance with attributes of a target person (for example, race and clothes).

In the conventional techniques, however, even if the resolution is enhanced by simply using a plurality of pieces of image data captured by a security camera, these pieces of image data may not be suitable for visual checking. In some cases, the face direction of a subject captured in image data by a security camera is not suitable for visual checking. In other cases, a mask, a pair of sunglasses, or the like worn on part of a face disturbs visual checking.

BRIEF DESCRIPTION OF THE DRAWINGS

FIG. 8 is an exemplary diagram illustrating the structure of a table possessed by a feature information storage in the first embodiment;

DETAILED DESCRIPTION

In general, according to one embodiment, a person image processing apparatus comprises: an input processor configured to input a plurality of pieces of image data captured at different times by an image capture module; an extraction module configured to extract a person display area showing a same person from each of the pieces of image data captured at the different times; a feature detector configured to detect a feature point showing a feature of a part of a person from the person display area extracted from each of the pieces of image data and acquire reliability of the part shown in the feature point; and a correction module configured to, when correcting the person display area subjected to input processing by the input processor, perform weighting based on the reliability of the feature point included in the person display area.

A person image processing apparatus according to an embodiment comprises an input processor, an extraction module, a feature detector, and a correction module. The input processor inputs a plurality of pieces of image data captured at different times by an image capture module. The extraction module extracts a person display area showing the same person from each of the pieces of image data with different image capture times. The feature detector detects feature points each showing a feature of a part of the person from each of the person display areas extracted from the pieces of image data, and acquires reliability of each of the feature points showing the part. The correction module, when correcting the person display area subjected to input processing by the input processor, performs weighting based on the reliability of the feature points included in each person display area.

First embodiment

Figure 1:
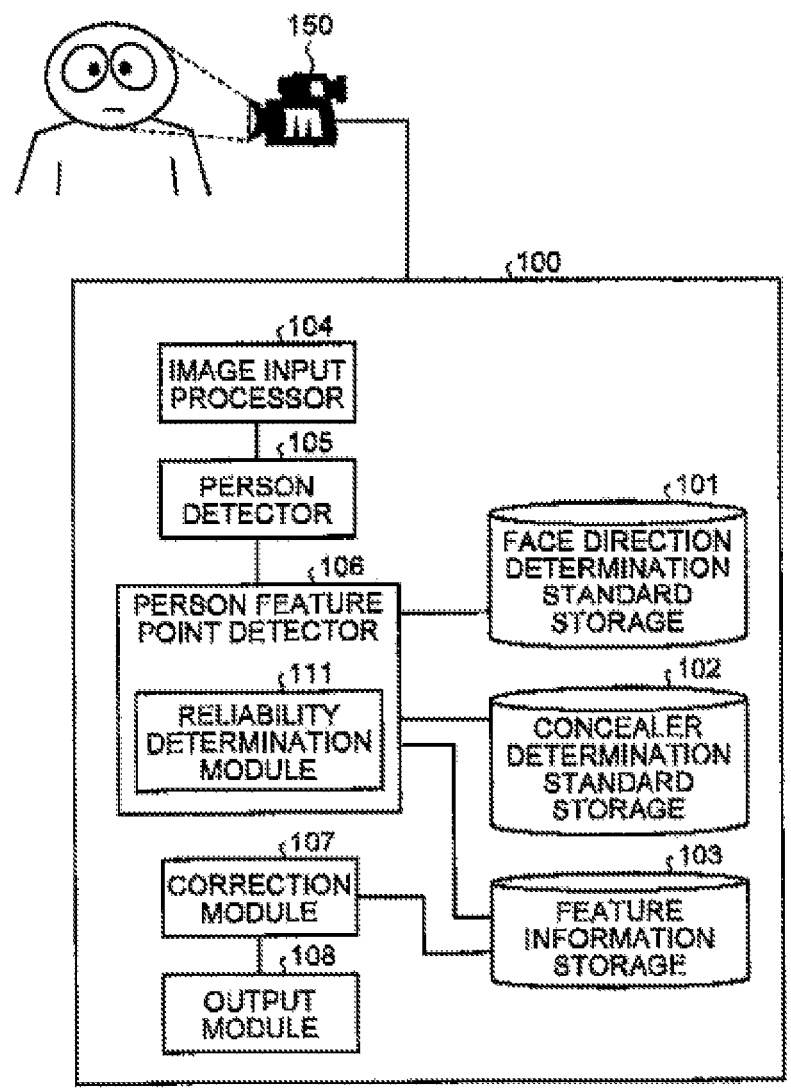
FIG. 1 is an exemplary diagram illustrating the block configuration of a person image processing apparatus according to a first embodiment.

FIG. 1 is a diagram illustrating the block configuration of a person image processing apparatus according to the first embodiment. As illustrated in FIG. 1, this person image processing apparatus 100 comprises a face direction determination standard storage 101, a concealer determination standard storage 102, a feature information storage 103, an image input processor 104, a person detector 105, a person feature point detector 106, a correction module 107, and an output module 108. The person image processing apparatus 100 is connected to a security camera 150 and inputs image data captured by the security camera 150.

The person image processing apparatus 100 extracts an area showing a person in image data subjected to input processing by the image input processor 104, detects feature points of the person from the area, and outputs the image data of the person corrected based on the feature points. In this process, the person image processing apparatus 100 performs the correction using a plurality of pieces of image data in accordance with the condition of a subject during capture to generate image data that is easy to be visually checked.

From the image data captured by the security camera 150, the face of the person is detected and recorded. The image data captured by the security camera 150 may be still image data or moving image data. The image data input to the person image processing apparatus 100 is not limited to image data captured by an image capture module. For example, the image data may be moving image data recorded in a digital video recorder (DVR), a storage medium, or the like.

The security camera 150 captures images of a predetermined area. For example, the security camera 150 captures images of an entrance and exit area on a passage. The present embodiment does not limit a place in which the security camera 150 is installed. The security camera 150 may be installed in, for example, a street, a building, and a public area.

The security camera 150 captures an image of a person to be captured and is, for example, an ITV camera capable of capturing moving image data. The security camera 150 employs an A/D converter to digitize optical information obtained through its own lens so as to generate and output image data to the person image processing apparatus 100. The security camera 150 may be singularly or plurally installed. A plurality of the security cameras 150 may be installed in a plurality of places or may be installed at different heights or the like in the same place.

Figure 2:
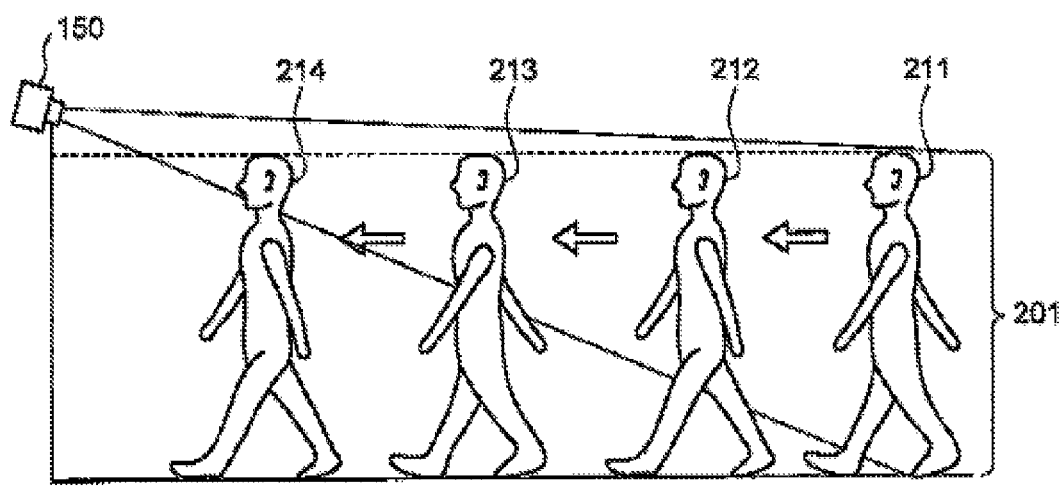
FIG. 2 is an exemplary diagram illustrating the concept of an image capturing area by a security camera in the embodiment.

FIG. 2 is a diagram illustrating the concept of an image capture area 201 captured by the security camera 150. As illustrated in FIG. 2, when a person walks toward the security camera 150, the person is supposed to advance along positions 211, 212, 213, and 214 as time passes. As illustrated in FIG. 2, when the person is at a distant position (for example, the position 211), the person is positioned facing relatively straight toward the security camera 150. As the person approaches the camera (for example, the position 214), the person approaches an area directly below the security camera 150. As the person approaches, an area showing the person becomes large on the security camera 150, which increases resolution of the captured image data in the area. However, an angle at which the person is displayed starts to deviate from the front, which can accordingly increase difficulty in visual checking of the person in the captured image data. This problem is solved by the person image processing apparatus 100 according to the present embodiment.

The person image processing apparatus 100 according to the present embodiment is intended for use for checking image data captured by the security camera 150 when a problem occurs in a place where the person image processing apparatus 100 is installed.

The person image processing apparatus 100 generates image data showing a person (hereinafter referred to also as the person image data). In this process, the person image processing apparatus 100 performs image correction in accordance with the condition of a subject so that visual checking of a person can be easily performed.

The face direction determination standard storage 101 stores therein face direction standard information as a standard for determining the face direction of the person displayed on the image data.

The concealer determination standard storage 102 stores therein concealing standard information as a standard for determining whether part of the face of a person displayed in the image data is concealed. The person image processing apparatus 100 according to the present embodiment stores therein templates in advance that have learned face patterns with part of a face concealed with a pair of sunglasses, a mask, or a cap, in order to detect a case in which part of the face of the person displayed in the image data is concealed with a mask, a pair of sunglasses, a cap, or the like. For example, the brightness gradient feature between a previously prepared image of a face with a concealer worn and a previously prepared image of the face without the concealer is employed to derive a determination standard about whether the concealer is worn on the face. This determination standard is stored in the concealer determination standard storage 102.

The image input processor 104 inputs a plurality of pieces of image data captured at different times by the security camera 150.

The person detector 105 extracts an area showing the same person from each of the pieces of image data with different image capture times.

The person detector 105 determines, as an area showing a person, a coordinate area showing the face of a person using brightness information in image data. Any calculation method may be used including "Takeshi Mita, et al., 'Joint Haar-like Features Based on Feature Co-occurrence for Face Detection', The Transactions of the Institute of Electronics, Information and Communication Engineers (D), vol. J89-D8, pp. 1791-1801 (2006)".

The present embodiment is not limited to the shape of a face area extracted with the direction and size of the face taken into account, but is applicable to any shape of the face area. The present embodiment is an example showing the face area as rectangular information for ease of explanation. The coordinates of the corners of the rectangular information are used as a detection result. The present embodiment can be also achieved by a method in which a prepared template is moved within an image to determine correlation values, and a position that provides the highest correlation value is determined as a face display area, and by a face extraction method using the eigenspace method and the subspace method, for example.

In image data captured by the security camera 150 or the like, the detected face of the same person appears in a plurality of successive frames (image data). These frames need to be made correlated as showing the same person by tracking the face of the person. This can be achieved by possible methods including a method of correlating a face detected using an optical flow with a position in the next frame (image data) and a method described in a publicly known technical document (Japanese Patent Application Laid-open No. 2011-170711).

This allows the person feature point detector 106, which will be described later, to select at least one piece of image data that is suitable for searching in areas showing faces in a plurality of pieces of image data correlated as showing the same person, and to use an arbitrary number of pieces of image data up to the number of detected frames at a maximum.

Figure 3:
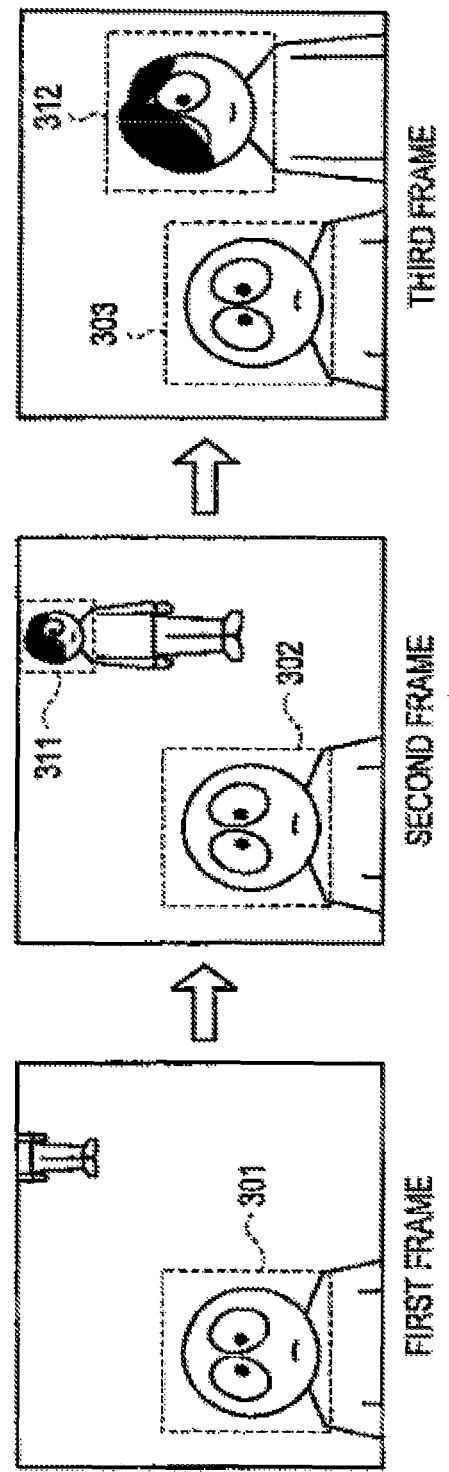
FIG. 3 is an exemplary diagram illustrating a person area detected by a person detector in the first embodiment.

FIG. 3 is a diagram illustrating person areas detected by the person detector 105. In an example illustrated in FIG. 3, the person areas are captured by the security camera 150 in the order of the first frame, the second frame, and the third frame. As illustrated in FIG. 3, the person detector 105 can detect face areas of a plurality of people.

The person detector 105 detects a face display area 301, a face display area 302, and a face display area 303 as areas showing the same person (for example, a first person), and detects a face display area 311 and a face display area 312 as areas showing the same person (for example, a second person) by the above-described tracking technology.

The present embodiment describes examples of detecting a face area as a person area. However, an object to be detected is not limited to a face, and an area showing the entire person may be detected. As a technique of detecting an area showing the entire person, for example, "Watanabe, et al., 'Co-occurrence Histograms of Oriented Gradients for Pedestrian Detection, In Proceedings of the 3rd Pacific-Rim Symposium on Image and Video Technology', PSIVT2009, pp. 37-47" may be used. Any technique of detecting a person area may be used, and the object to be detected may be any part including a face, the entire person, or other body. As far as feature information can be detected from an object to be detected, any method other than the method described in the present embodiment may be used for this purpose.

The person feature point detector 106 detects feature points each indicating a feature of a person in an area showing the person (a face display area) detected from each of a plurality of pieces of image data. The person feature point detector 106 according to the present embodiment acquires reliability representing the extent to which a part is actually displayed in the detected feature point.

The person feature point detector 106 detects positions of face parts such as an eye and a nose as face feature points in the detected face display area. Any detection method may be used including a method described in "Kazuhiro Fukui and Osamu Yamaguchi, 'Facial Feature Point Extraction Method Based on Combination of Shape Extraction and Pattern Matching', The Transactions of the Institute of Electronics, Information and Communication Engineers (D), vol. J80-D-II, No. 8, pp. 2170-2177 (1907)".

Any of those methods can acquire information that can be treated as a two-dimensional image, from which an area of face features can be detected.

The person feature point detector 106, when extracting only one face feature from one image in the detection processing, may determine correlation values between a template and all images to output a position and size at the maximum correlation value. The person feature point detector 106, when extracting a plurality of face features, may determine local maximum values of the correlation value in the entire image, narrow down candidate positions in a face by taking into account overlaps between those positions within one image, and take into account their relationships with past images successively input (temporal development) to finally detect a plurality of face features simultaneously.

Figure 4:
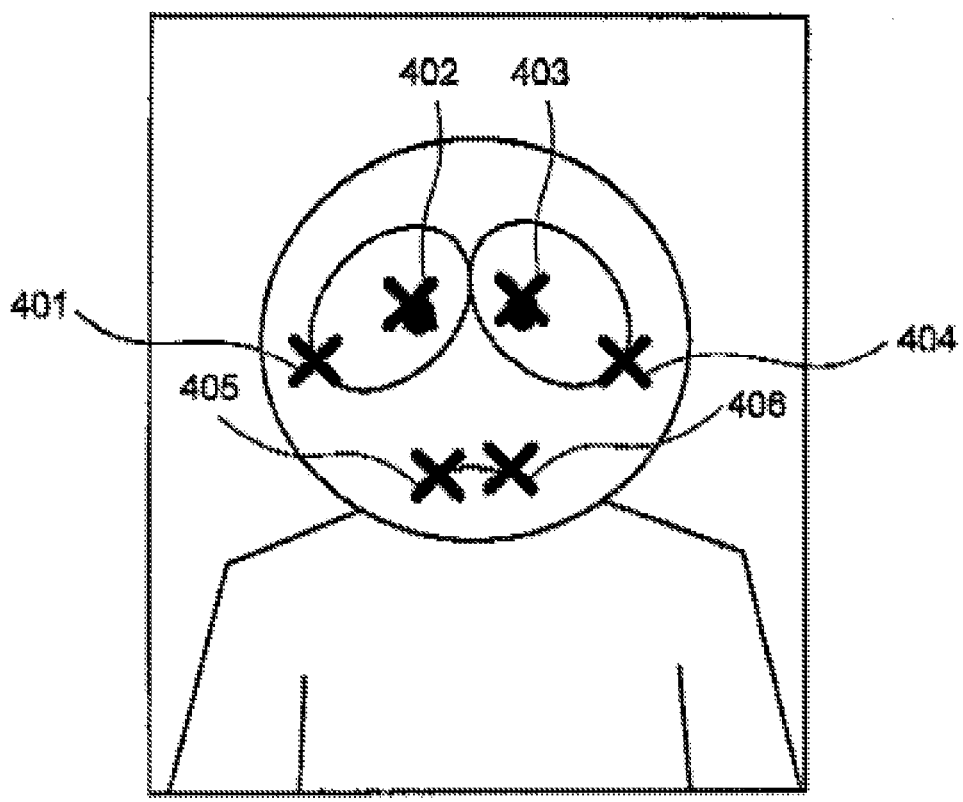
FIG. 4 is an exemplary diagram illustrating an example of feature points detected by a person feature detector in the first embodiment.

FIG. 4 is a diagram illustrating an example of feature points detected by the person feature point detector 106. As illustrated in FIG. 4, the person feature point detector 106 detects feature points 401 to 406 on pupils, the corner of each eye, and a mouth. The present embodiment does not limit the position and number of feature points, and appropriate positions and number of feature points may be set for each embodiment. These feature points 401 to 406 have possibility of being concealed by a pair of sunglasses, a mask, a cap, or the like.

To address this, the person feature point detector 106 according to the present embodiment refers to learning results obtained for cases where part of a face is concealed by a pair of sunglasses, a mask, and a cap, which are stored in the concealer determination standard storage 102. When not all the feature points cannot be detected but still part of these partial feature points is detected with a sufficient evaluation value, the person feature point detector 106 estimates a remaining feature point using a two-dimensional or three-dimensional face model.

When feature points of a face are concealed by a mask, a cap, a pair of sunglasses, or the like to such an extent that all feature points cannot be detected, the person feature point detector 106 can detect the outline of the entire face to be used for estimating the position of each feature point, using the concealer determination standard storage 102 that stores therein a learning result with the entire face as a pattern. The person feature point detector 106 can then estimate the position of each feature point from the outline of the entire face. This estimation can be achieved, when a plurality of faces are present within a piece of image data, by performing the same processing on each area in which a face is detected.

Various situations can be considered as a case in which part of a face is invisible. The present embodiment will now describe, as an example of such a case, examples in which a feature point of the face is hard to be detected owing to a face direction or a concealer worn on the face.

An exemplary method for estimating a face direction is a method described in Japanese Patent Application Laid-open No. 2003-141551 (Tsugumi Yamada, Kazuhiro Fukui, Atsuto Maki, and Akiko Nakajima, "METHOD AND SYSTEM FOR CALCULATING FACE DIRECTION"). The method estimates a face direction by using a rotation matrix of the face and a plurality of classes (partial spaces) learned for each face direction. This allows determination of the face direction and hence estimation of whether an angle that the face makes is large or small enough to make part of the feature points of a face hard to be seen.

The person feature point detector 106, when detecting a feature point, acquires reliability indicating a degree about whether the feature point is detected from a part of an actual person. In the process, the reliability with respect to a face feature point is changed in accordance with a face direction. In other words, even though a feature point of a face is detected, a severe angle of a face direction lowers the possibility that the feature point is detected from an actual part. In such a case, the reliability is desired to be decreased.

Based on standard information stored in the face direction determination standard storage 101, a reliability determination module 111 according to the present embodiment detects a face direction of a person from a face display area of image data. The reliability determination module 111 thereafter changes the reliability of the feature points of the face based on the face direction.

Figure 5:
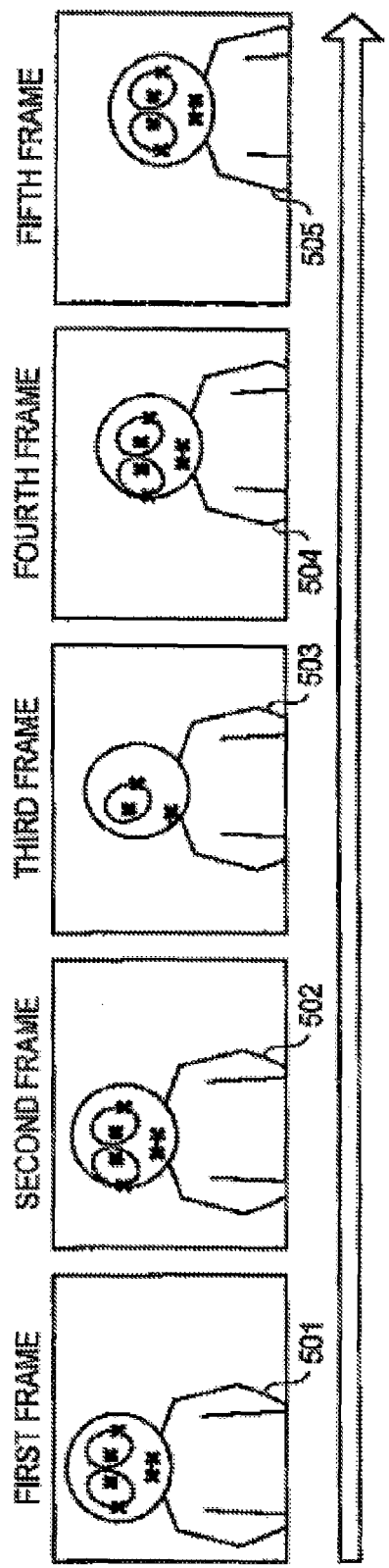
FIG. 5 is an exemplary diagram illustrating differences in detected feature points in accordance with a face direction for each frame (image data) in the embodiment.

FIG. 5 is a diagram illustrating differences in detected feature points in accordance with the direction of a face for each frame (image data). The example illustrated in FIG. 5 is an example in which image data to be subjected to input processing changes in the order of the first frame, second frame, third frame, fourth frame, and fifth frame as time passes. As illustrated in FIG. 5, when the direction of the face changes while the person is walking, it is considered that each part of the face is viewed properly if the face direction is determined to be straight in such cases of a person 501 in the first frame and a person 505 in the fifth frame. The reliability determination module 111 therefore sets a high reliability of each part of the face.

When the direction of the face is slightly tilted in such cases of a person 502 in the second frame and a person 504 in the fourth frame, it is preferable that the reliability determination module 111 sets, for example, a slightly reduced reliability for a feature point that is likely to disappear such as the corners of eyes.

When the right side of the face is not shown in such a case of a person 503 in the third frame, the reliability determination module 111 decreases the reliability for the feature point detected as a part on the right side of the face.

The reliability is preferred to be changed in a similar manner not only when the face direction is severe, but also when a pair of sunglasses, a mask, a cap, front hair, a mustache, or the like is present.

Any method may be used for determination of the presence of a wearing object concealing a face such as a mask, a pair of sunglasses, or a cap and for determination of whether part of a face is concealed by the front hair, a mustache, or the like. For example, a method described in Japanese Patent Application Laid-open No. 2012-3623 may be used.

The person feature point detector 106 according to the present embodiment determines the presence of a concealer based on whether a face display area of image data resembles to an image in which a concealer is worn, using a support vector machine or a discrimination analysis method, apart from the concealer determination standard storage 102.

When it is determined that a concealer is present, the reliability determination module 111 decreases the reliability of a feature point that is thought to be concealed by the concealer.

For example, when the person feature point detector 106 determines that sunglasses are worn, the reliability determination module 111 decreases the reliability of feature points concerning an eye (for example, the outer corner of an eye, the inner corner of an eye, and a pupil) and of information on the vicinity of an eyebrow. In another example, when it is determined that a mask is worn, the reliability determination module 111 decreases the reliability of feature points concerning a mouth and a nose.

The present embodiment has described examples in which reliability is determined based on whether the entire area of the parts of a face is comprehensively visible., the embodiment is not limited to such a method. As another example, reliability may be increased when the resolution of a part of a face is high or when the contrast is high (the variance of the distribution of brightness is large, or the difference between the maximum and minimum brightness values is large). Furthermore, based on the fact that the image data is not blurred and the sharpness is high when the FFT is performed on the entire image and the value of a high-frequency component is high, the reliability determination module 111 may perform control to increase reliability when the value of the high-frequency component is high.

For example, when the person feature point detector 106 detects a feature point of a face, the reliability determination module 111, with respect to an image displaying the feature point of an area with a predetermined size (for example, M×N pixels) in the vicinity of the feature point, determines contrast from the maximum brightness and minimum values of the image of the area or the variance of the brightness value. When the contrast is high, the reliability is multiplied by a predetermined coefficient (for example, a value exceeding 1) to increase the reliability. When the contrast is low, conversely, the reliability is multiplied by a predetermined coefficient (for example, a value less than 1) to decrease the reliability.

The reliability determination module 111 determines average brightness within the M×N-pixel area displaying a feature point, and hence the brightness. The reliability determination module 111 performs adjustment to increase the reliability when the determined brightness is a medium value and to decrease when it is too high or too low.

Based on the distance between feature points or the like, the number of pixels indicating the size of a part of a face indicated by the feature points can be determined. In accordance therewith, the reliability determination module 111 changes reliability based on the "resolution" of each part of the face. In the present embodiment, higher resolution is defined to have better image quality. The reliability determination module 111 multiplies the reliability by a coefficient in accordance with the determined resolution, thereby controlling the level of the reliability.

Figure 6:
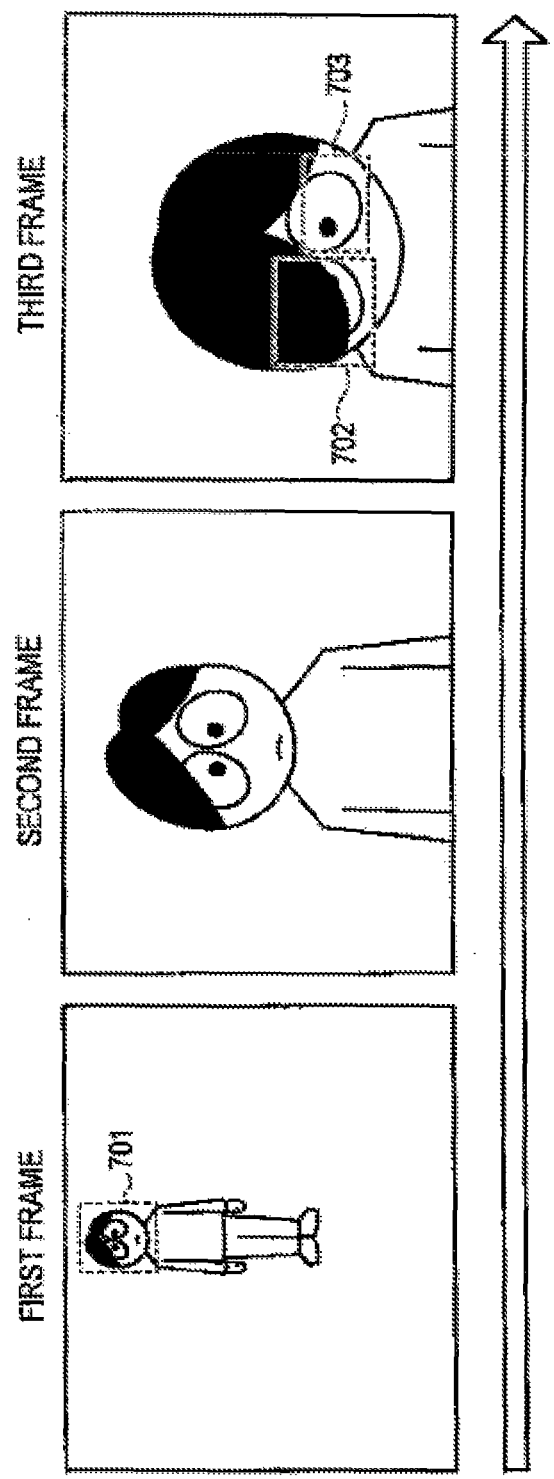
FIG. 6 is an exemplary diagram illustrating a face direction and reliability for each image data in the embodiment.

FIG. 6 is a diagram illustrating a face direction and reliability for each image data. In the example illustrated in FIG. 6, in the first frame, each feature point can be detected from a face display area 701. When the person feature point detector 106 detects a feature point in the first frame, the reliability determination module 111 slightly decreases the reliability of each point detected in the face display area 701, because of a lower resolution of the face display area.

In the third frame, a forehead area and a right-eye adjacent area 702 are hard to be recognized due to the front hair from the positional and angular relationship between the security camera 150 and the person in spite of a high resolution of the entire face. When the person feature point detector 106 detects feature points, therefore, the reliability determination module 111 decreases the reliability of the feature point detected from the right-eye adjacent area 702. In addition, the reliability determination module 111 increases the reliability of the feature point included in the left-eye adjacent area 703 because the resolution of a left-eye adjacent area 703 is high.

Figure 7:
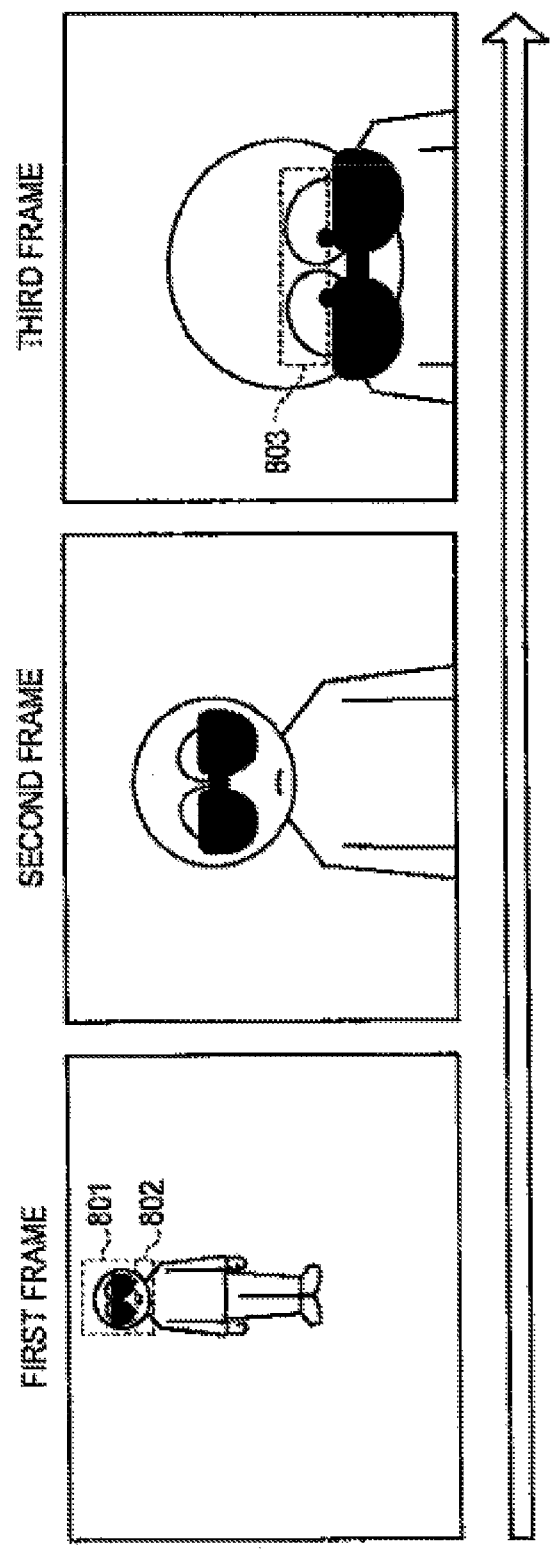
FIG. 7 is an exemplary diagram illustrating a concealer and reliability for each image data in the embodiment.

FIG. 7 is a diagram illustrating a concealer and reliability for each image data. The example illustrated in FIG. 7 is an example in which the concealer is a pair of sunglasses. In the first frame, no appropriate feature points can be detected in a part included in an area 801 of a face displaying area, while feature points can be appropriately detected in a part included in an area 802 of the face displaying area. When the person feature point detector 106 detects the feature points and concealment by the sunglasses, the reliability determination module 111 decreases the reliability of feature points included in the area 801, while slightly decreasing the reliability of feature points included in the area 802.

In the third frame, the positional and angular relationship between the security camera 150 and the person makes it possible to capture a peripheral area of eyes 803 through the edge of the sunglasses. In the third frame, the security camera 150 and the person are close to each other, resulting in a high resolution of the adjacent area. When the person feature point detector 106 detects the feature points, therefore, the reliability determination module 111 decreases the reliability of feature points detected in the peripheral area of eyes 803, while decreasing the reliability of feature points detected in an area below the adjacent area 803.

Management of a face area by finely dividing the area enables management such as changing the reliability only for part of a displayed eye.

The reliability may be set to a value from 0 to 1 based on a correlation value, a simple degree of similarity, or a degree of similarity obtained by a subspace method, which is evaluated using average patterns each learned for a face feature point. When the reliability determination module 111 changes reliability based on a face direction, $\cos \theta$ may be calculated from an angle $\theta$ of the face with respect to the optical axis of the security camera 150 capturing image data, and using the calculated $\cos \theta$, the reliability may be changed.

As described above, in the present embodiment, after detection of a feature point of each part of a face in a face display area, the extent is determined to which the feature point of each part of the face is clearly visible from results of determination of a face direction and a concealer on a face, and then the reliability is changed accordingly. This enables simultaneous determination of feature points of a face and reliability depending on the condition of the face.

The present embodiment has exemplified a case in which the reliability is increased or decreased by allowing the reliability determination module 111 to multiply the degree by a coefficient in accordance with visibility of a feature point. Feature points each may have, however, reliability separately for each indicator of a feature point, instead of one for each feature point.

The feature information storage 103 stores therein information for identifying image data subjected to input processing and detected feature points of a person, the two correlated with each other. Furthermore, the feature information storage 103 stores therein the image data subjected to input processing.

FIG. 8 is a diagram illustrating the structure of a table provided in the feature information storage 103. As illustrated in FIG. 8, the feature information storage 103 stores therein a frame-identifying number, an index, and information on feature points 1 to N of a face, all correlated with each other. The frame-identifying number is uniquely set for each image data.

The index is uniquely set for each person. The index according to the present embodiment is set for each person detected by the person detector 105.

"N" in a featured point of a face indicates the number of the feature points in the face. "N" is set to be an appropriate value in accordance with an embodiment. For each feature point are stored an X coordinate indicating the feature point, a Y coordinated indicating the feature point, and the reliability of the feature point.

The feature information storage 103, for each face display area detected in an image, manages positional information on all feature points included in the face display area and reliability indicating whether the feature point is displayed clearly.

The frame numbers 1 to 3 illustrated in FIG. 8 correspond to the first to third frames in FIG. 3, respectively. In other words, the frame number "1" corresponds to the first frame in FIG. 3. The feature information storage 103 stores therein information on the feature points 1 to N in the face display area 301 of a person indicated by the index "1". The frame number "2" corresponds to the second frame in FIG. 3. The feature information storage 103 stores therein information on the feature points 1 to N in the face display area 302 of the person indicated by the index "1" and information on the feature points 1 to N in the face display area 311 of the person indicated by the index "2". The frame number "3" corresponds to the third frame in FIG. 3. The feature information storage 103 stores therein information on the feature points 1 to N in the face display area 303 of the person indicated by the index "1" and information on the feature points 1 to N in the face display area 312 of the person indicated by the index "2".

The person of the index "1" is detected with a high reliability of the feature point of the face at each feature point. With a low reliability of the face feature point 2, the reliability determination module 111 determines that the person of the index "2" has part of the face concealed. In the example illustrated in FIG. 3, it is considered that a concealer worn such as a pair of sunglasses causes a lower reliability. The similar determination is also preformed when concealment is due to a face direction.

Information stored in the feature information storage 103 is not limited to the image data subjected to input processing and the above-described correlation listed in the table. For example, when the person feature point detector 106 identifies the face direction angle and the result of determination of wearing a mask, a pair of sunglasses, a cap, or the like used for the determination of reliability, the feature information storage 103 may store therein at least one of the face direction angle and the result of the determination of wearing in a correlated manner. When the person feature point detector 106 obtains reliability for each indicator, a plurality of determined reliability may be managed in a similar method as one described above.

The correction module 107 corrects a face display area detected from image data subjected to input processing performed by the image input processor 104 to generate person image data showing the face display area. In that process, the correction module 107 performs weighting based on the reliability of the feature points included in the face display area, and then performs correction.

While timing of correction using a plurality of pieces of image data by the correction module 107 is not limited to a particular method, in the present embodiment, correction is performed at all times using a predetermined number of pieces of past image data. In this case, for correction performed on the t-th frame, out of n pieces of image data from the t-n frame to t-1 frame, all (n) pieces of image data may be used, or any number m (m<n) of pieces of image data may be used.

In consideration of a person being moving, the correction module 107 may perform correction using a predetermined number of pieces of image data in the following cases: when image data detecting the same person reaches the predetermined number of pieces; when the person has become undetectable (when the person has moved out of a capture area); and when it is determined that the person detector 105 has terminated tracking of the person.

The correction processing by the correction module 107 includes, for example, the super-resolution processing (interpolation processing on resolution when enhancing the resolution). For the super-resolution processing method, any method may be used including a technique described in "Hidenori Takeshima, Nobuhiro Kato, and Toshimitsu Kaneko, 'Super-Resolution Technique for a Plurality of Frames Using Sub-Pixel Shift Image', Toshiba Review, vol. 64, No.6, pp. 11-(2009)". The processing of enhancing the resolution includes generation of image data with high image quality using a plurality of frames (image data).

The correction module 107 according to the present embodiment uses a method for generating image data of high image quality using a plurality of frames. The correction module 107 according to the present embodiment combines all areas included in a face display area detected from a plurality of pieces of image data and generates person image data of super-resolution showing the same person. In that process, the correction module 107 correlates a plurality of face display areas detected in a plurality of frames using coordinates at which the person feature point detector 106 has detected a feature point. The correction module 107, based on correlation between feature points in each frame, performs super-resolution processing using a plurality of face display areas. In the process, the present embodiment uses the reliability of the feature point included in each area as a weight.

In other words, the correction module 107 according to the present embodiment, when correlating feature points, reduces the degree of correlation between a plurality of feature points at the low feature points concerned, and further strengthens the degree of correlation between a plurality of feature points at feature points with higher reliability. This allows clear super-resolution image data to be generated.

The correction module 107 according to the present embodiment does not establish correlation between feature points of a face with a low reliability or in the adjacent area thereof, but instead generates super-resolution image data using brightness information within one frame. The range of the adjacent area of a feature point is not particularly limited, and may be, for example, within a predetermined number of pixels of the feature point. Correction processing weighted by reliability may be performed in which the range changes so that the reliability reduces further away from the feature point.

The correction module 107 according to the present embodiment, when the resolutions of the face display areas of a plurality of frames to be used in generation of person image data differ, matches their resolutions by performing reduction or enlargement on each face display area before combination. When combining the areas, the correction module 107 increases weight of a face display area with high resolution out of face display areas before reduction or enlargement.

Correction processing other than super resolution performed by the correction module 107 includes correction of contrast and brightness. The correction module 107 according to the present embodiment performs the correction processing of brightness using feature points correlated with each other within the face display areas included in a plurality of pieces of image data, as is the case with the super resolution.

The correction module 107 according to the present embodiment, when some points are correlated as indicating the same part within face display areas of a plurality of pieces of image data (n frames), performs the correction of brightness using this correlation. For example, when the coordinates of a feature point in the i-th frame image data correlated with another frame are (Xi, Yi), the brightness value at the coordinates is defined to be I(Xi, Yi), and the reliability at the coordinates is defined to be f(i). The correction module 107, for the coordinates of other than the feature points among the coordinates of face display areas included in image data, determines the reliability of the coordinates based on linear interpolation depending on the distance from an adjacent feature point. A brightness value after image correction I'(X, Y) is calculated by the following formula (1):

$$I'(X, Y) = \Sigma f(i) \times I(i, Xi, Yi) \quad (1).$$

The person feature point detector 106 determines the reliability for each indicator by multiplying the formula with all the coefficients, because each indicator holds the function f(i).

Separate calculations of a brightness value for each set of coordinates are likely to increase noise. For this reason, noise removal processing may be performed, in such a manner that the average brightness of the pixels in an adjacent predetermined range is determined before other correction processing is performed, or based on the average brightness of the pixels in an adjacent predetermined range, the upper limit and the lower limit of brightness fluctuations are set within a predetermine range, thereby preventing noise such as an outlier from being mixed in. This can generate contrasty, clear person image data from a low-contrast image in a predetermined frame, by performing contrast enhancement processing using images of a plurality of frames.

The correction module 107 may perform processing for improving sharpness without improving resolution. Sharpness improving processing is performed, after feature points are correlated as in the above-described processing, based on brightness information of an area that is regarded as the same part in face display areas in a plurality of frames. In the process, an area with a negligible brightness difference from adjacent pixels in a predetermined frame is accumulated over a plurality of frames to produce a clear brightness difference. The correction module 107 improves sharpness through correction into the image with an enhanced brightness difference. Image data with its sharpness improved may be generated by performing the above-described super-resolution processing and then restoring the original resolution.

The correction module 107 performs noise correction processing. The noise correction processing, after feature points are correlated as in the above-described processing, accumulates the brightness information on an area that is regarded as the same part in face display areas in a plurality of frames, and adopts an average value or a median value, thereby reducing noise.

The correction module 107 may generate person image data with the face direction of a target person therein corrected. As in the above-described processing, with feature points correlated over a plurality of frames, fluctuations in a face direction can be recognized through changes in the positions of the corresponding feature points. The correction module 107, in consideration of changes in the feature points, generates person image data using the brightness information of face display areas over a plurality of frames.

Furthermore, the correction module 107, when generating person image data from face display areas of a plurality of frames in consideration of the direction, may correlate feature points indicating the same part out of the feature points included in a plurality of face display areas, and then combine the images of the frames into one image and assign it to a predetermined three-dimensional person shape model. This is followed by correction of the direction of a person displayed in accordance with the three-dimensional shape model to generate the person image data. This method is described in detail in Japanese Patent Application Laid-open No. 2007-4767, for example, and the explanation therefor will be omitted.

The correction module 107 is not subject to perform all pieces of the above-described processing and may perform at least one piece of the above-described processing.

In the correction processing by the correction module 107, the following three methods using reliability are applied.

The first method is a method that, in order to decrease the weight of an area that is invisible due to a face direction, reduces the reliability of a feature point included in the area.

Figure 9:
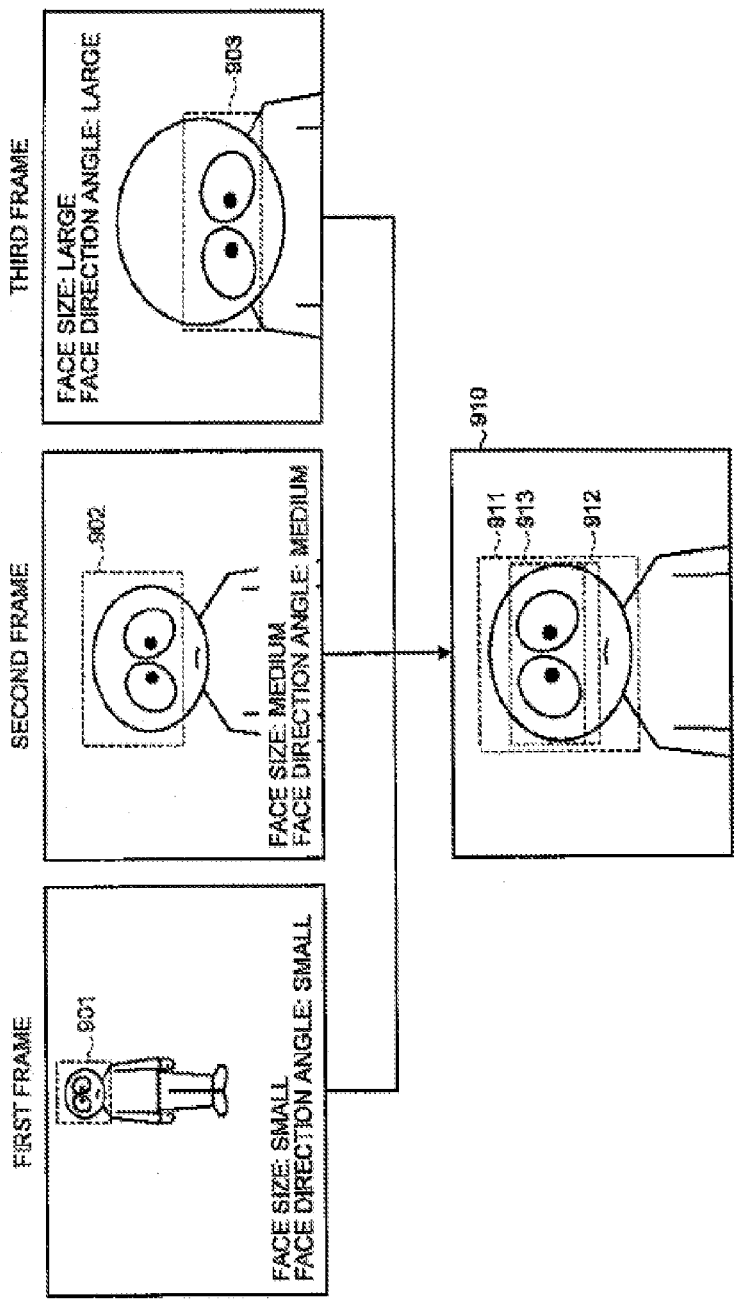
FIG. 9 is an exemplary diagram illustrating an example in which face display areas of a plurality of frames are combined and person image data is generated by a correction module in the first embodiment.

FIG. 9 is a diagram illustrating an example in which face display areas of a plurality of frames are combined to generate person image data. In the example illustrated in FIG. 9, the security camera 150 is often installed at such an angle that it looks down from a higher position than a walking person. In this case, at a position distant from the security camera 150 (for example, the first frame), the direction of a face is relatively straight along the optical axis of the camera, that is, a face display area 901. Because of a large distance from the security camera 150, the resolution of the face display area 901 is low. Although as the person walks forward, the resolutions of face display areas 902 and 903 gradually become higher, the angle of the face deviates from the optical axis of the security camera 150, making it likely to cause an image to be captured while the face is directed relatively downward. In the detected face display areas 902 and 903, thereby, in spite of the high resolutions, all feature points are likely may not be detected, or a wrong position is likely to be detected as a feature point.

In addition, because the person is walking without being conscious of the camera, the face direction may change due to his facing downward, looking aside, or the like.

Given these circumstances, the reliability determination module 111 adjusts reliability in accordance with the face direction and resolution. Specifically, the reliability determination module 111 defines that "the reliability of a feature point included in the face display area 901 is less than the reliability of a feature point included in the face display area 902, which is less than the reliability of a feature point included in the face display area 903." In the second to third frames, the reliability is set to be lower in the areas not included in the face display area 902 and the face display area 903 than that of the feature point included in the face display area 901.

In the first frame, because the face is nearly directed to the front, the reliability is relatively high at the feature points, while the resolution is low. In the super-resolution processing, therefore, the brightness values of pixels adjacent to any feature point are used for the super-resolution processing using a plurality of frames. In the third frame, while the super-resolution processing is easily performed due to the high resolution, the face tends to be directed downward, resulting in a high reliability at a feature point in the upper part of the face and a low reliability at a feature point in the lower part of the face.

The correction module 107 thereby performs image correction processing by preferentially using the brightness information of a visible region (having a higher reliability), while reducing the use of the brightness information of an invisible region (having a lower reliability).

In the example illustrated in FIG. 9, the face display area 901 in the first frame, the face display area 902 in the second frame, and the face display area 903 in the third frame are combined to generate person image data 910. In this process, based on the reliability, the face display area 901 is preferentially used for an area 911, the face display area 902 is preferentially used for an area 912, and the face display area 903 is preferentially used for an area 913. Person image data is thus generated based on the reliability.

The second method is a method that, when an area concealed by a mask, a pair of sunglasses, or the like, is present, makes a visible area other than the concealed area easy to be visible.

Figure 10:
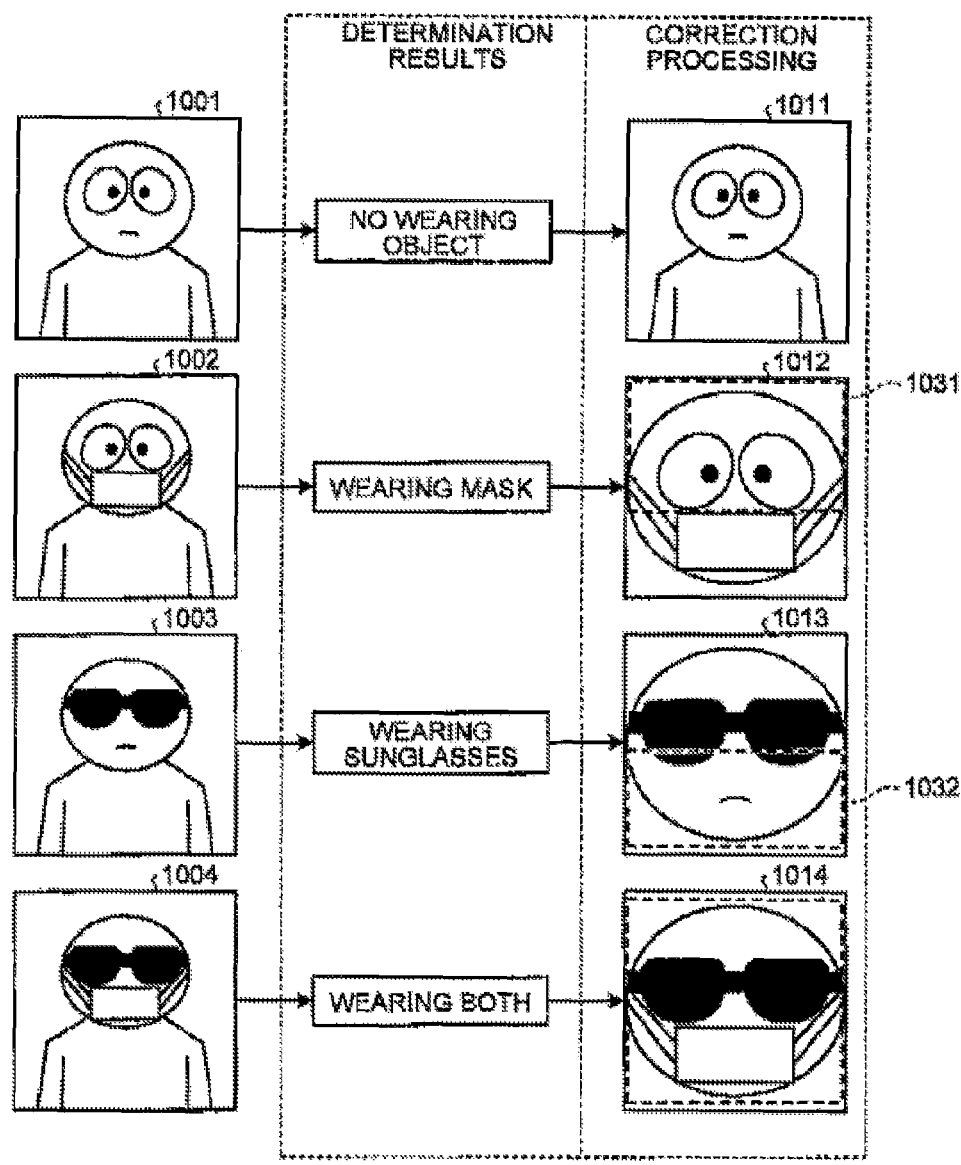
FIG. 10 is an exemplary diagram illustrating correction processing performed by the correction module in the first embodiment based on a concealer detected from a face display area.

FIG. 10 is a diagram illustrating correction processing performed by the correction module 107 based on a concealer detected in a face display area. In the present embodiment, concealment of a face by a wearing object such as a mask or a pair of sunglasses results in a low reliability of feature point in the concealed area.

When determination performed by the reliability determination module 111 using the concealer determination standard storage 102 detects that part of the face is concealed by a mask, a pair of sunglasses, a cap, front hair, a mustache, or the like, the feature information storage 103 stores therein this detection result. Given these circumstances, the correction module 107 according to the present embodiment performs correction using the determination result. This allows appropriate correction based on a clear determination result.

Because it is desirable that an unconcealed part be able to be checked in more detail, the correction module 107 performs image quality correction processing on the unconcealed area to provide a high precision in the area. Normal image quality correction processing is performed at normal times, thereby allowing efficient image checking of image data without increased load on the system at all times.

In the example illustrated in FIG. 10, after being processed through conventional correction processing, a face display area 1001 having no face concealer is displayed and recorded as normal person image data 1011.

In face display areas 1002 and 1003 in which a concealer has been detected, high-precision image quality correction is performed on other areas than the concealed area to output person image data 1012 and 1013. In other words, the correction module 107 performs, when wearing of a mask has been detected in the face display area 1002, high-precision image quality correction on an area other than a mask 1031. The correction module 107 performs, when wearing of a pair of sunglasses has been detected in the face display area 1003, high-precision image quality correction on an area other than sunglasses 1032.

When a wearing object conceals the entire face, high-precision image quality correction is performed on the entire area of a detected face display area 1004 to output person image data 1014. As another example, the correction module 107 may perform, when wearing of a mask and a pair of sunglasses has been detected in the face display area 1004, high-precision image quality correction processing exclusively on the vicinity of the outline of the head to achieve effective use of resources.

The high-precision processing in the image correction may, for the super-resolution processing, determine correlated feature points with high precision by enlarging a search range or reducing the a search step for correlated feature points, both taking time, and may, for noise removal and brightness correction processing, replace filter processing and processing calculations with processing that imposes processing load to generate high-precision person image data.

The above-described first method and second method may be combined. When they are combined, as illustrated in FIGS. 6 and 7, even when the face of a moving person is concealed by the front hair or a wearing object such as a pair of sunglasses, an area of the face concealed by such concealers changes with the face direction while the person is walking. Given these circumstances, the correction module 107 according to the present embodiment combines visible areas and performs the above-described high-precision processing to generate person image data.

In the example illustrated in FIG. 6, the area from the forehead to the eye which is captured without being concealed by the front hair in the first frame becomes covered with the front hair and unable to be captured in the third frame as the person approaches the security camera 150. In this case, the person feature point detector 106 detects more feature points of the face and determines the reliability of visibility between parts of the face more finely, thereby allowing the correction module 107 to perform combination by detailed face area.

In the example illustrated in FIG. 7, although an area of the eye is covered with a pair of sunglasses in the first frame, the area used to be covered with the pair of sunglasses is captured in the third frame, because the person approaches the security camera 150. This allows the area of the eye to be combined as person image data.

The third method is a method of, when an area concealed by a mask, a pair of sunglasses, or the like, removing the concealer and interpolating the image to generate person image data. A simplest feasible method is a method of, upon preparing an average image of the face display areas of a person, combining the concealed area through interpolation with the averaged face image. Another method may statistically estimate brightness by statistically determining the distribution of peripheral brightness. Another example of this method is a method described in "Ogawa et al., "Learning Type Super-Resolution by the Use of High-Frequency Enhancement Processing and Input Image," Meeting on Image Recognition and Understanding (MIRU2010) (2010) IS2-35."

Thus, the correction module 107, when generating person image data showing the same person from the face display areas in a plurality of pieces of image data, replaces the area of part of the face of the person determined to be concealed, with an interpolated image using a statistically learned brightness pattern. This can generate person image data in which the person is more easily recognized.

Not all pieces of above-described correction processing is necessarily performed. Either one piece of processing or a plurality of different pieces of image correction processing may be performed. Furthermore, image data may be generated at each correction processing.

The output module 108 displays the correction result obtained by the correction module 107 on a screen. Alternatively, the output module 108 records the person image data obtained by the correction module 107 in a recording device. Alternatively, the output module 108 may transmit person image data corrected by the correction module 107 to a connected device.

When a plurality of pieces of person image data as correction results are input from the correction module 107, the image correction results may be displayed or recorded in a preset order. They may be displayed in order from person image data having a higher total value of the reliability of face parts. When a plurality of candidates are shown, an objective image can be increasingly likely to be included by human visual checking.

Figure 11:
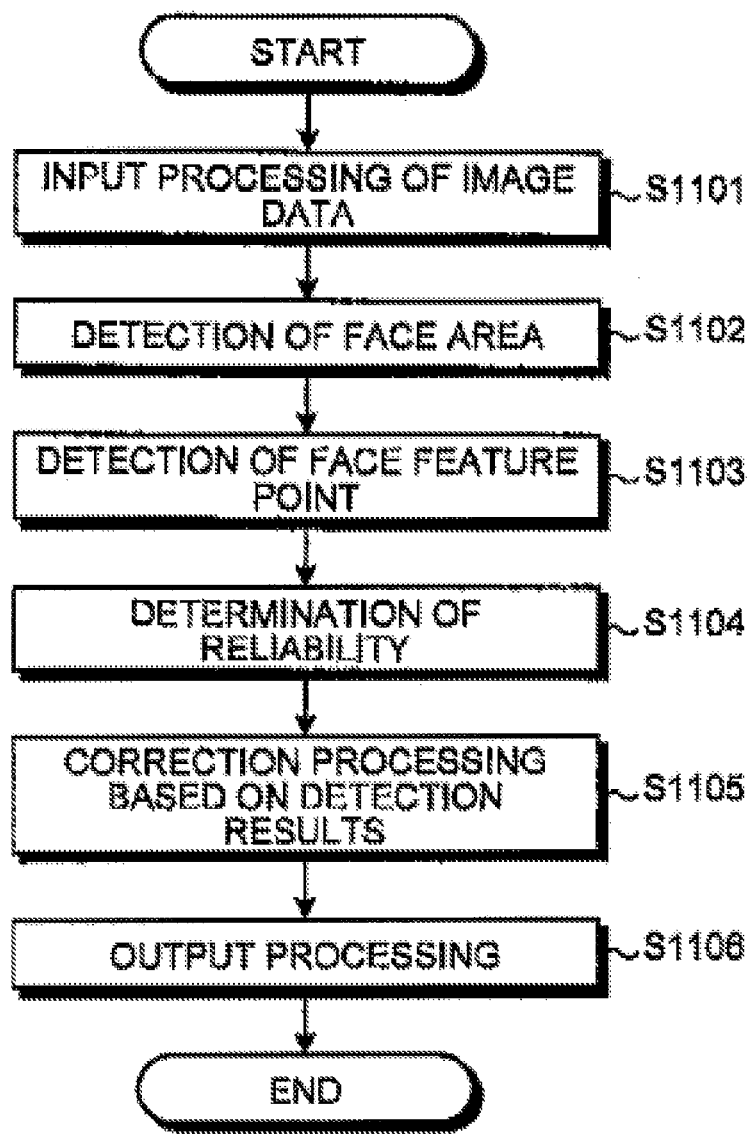
FIG. 11 is an exemplary flowchart illustrating the entire processing procedure in the person image processing apparatus in the first embodiment.

Next, the entire processing in the person image processing apparatus 100 will be described. FIG. 11 is a flowchart illustrating the procedure of the above-described processing in the person image processing apparatus 100.

First, the image input processor 104 inputs a plurality of pieces of image data captured by the security camera 150 as time passes (S1101). The person detector 105 then detects a face display area from each image data subjected to input processing (S1102).

Next, the person feature point detector 106 detects a feature point of a face from the detected face display area (S1103).

The reliability determination module 111 then, based on the face direction determination standard storage 101 and the concealer determination standard storage 102, determines reliability from the detected feature point of the face (S1104).

The correction module 107 then, using the detection result of the feature point and determined reliability, performs correction processing on the pieces of image data to generate person image data (S1105). The output module 108 then displays the generated person image data (S1106).

The foregoing embodiment enables generation of person image data, which is easy to be visually checked in accordance with the condition of a person as a subject, from the image data captured by security camera 150 or the like.

Second embodiment

The first embodiment, which describes examples in which person image data is output, does not limit the use mode of the generated person image data to outputting. The second embodiment exemplifies authentication about whether a person is a specific person or search for a similar face.

The person image processing apparatus according to the second embodiment may compare person image data registered in advance with a presently captured person image, whereby searching for the same person. Possible uses of the person image processing apparatus include, for example, searching customer data for a regular customer, searching a suspicious person database for the person in question, and identity verification of an ID card when renewing it and prevention of duplicate issuing of it when newly issuing it.

The second embodiment, as in the first embodiment, describes examples of detecting the face of a person. The entire body of the person may be detected as described above.

Figure 12:
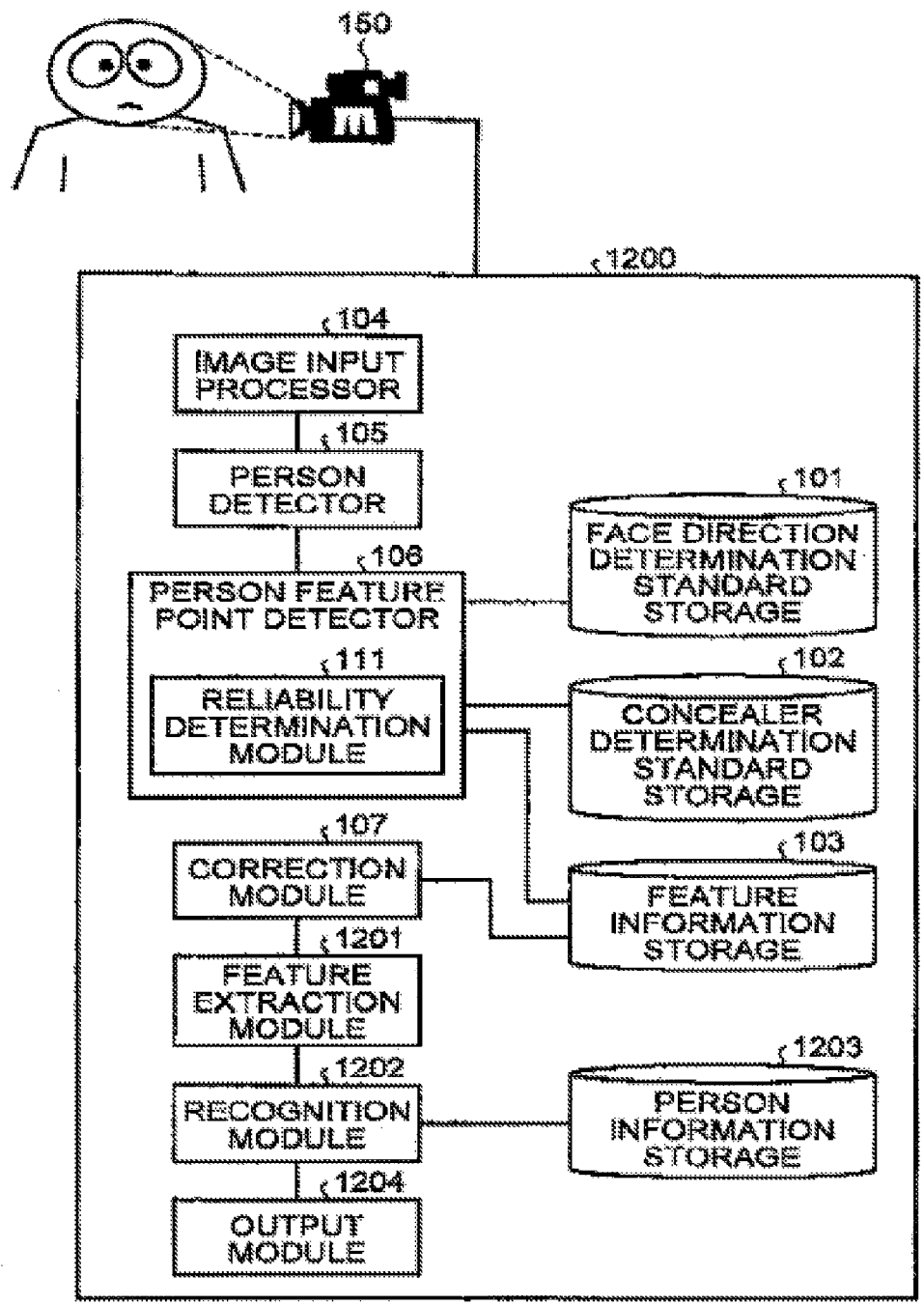
FIG. 12 is an exemplary diagram illustrating the block configuration of a person image processing apparatus according to a second embodiment.

FIG. 12 is a diagram illustrating the block configuration of the person image processing apparatus according to the second embodiment. As illustrated in FIG. 12, this person image processing apparatus 1200 comprises the face direction determination standard storage 101, the concealer determination standard storage 102, the feature information storage 103, the image input processor 104, the person detector 105, the person feature point detector 106, the correction module 107, a feature extraction module 1201, a recognition module 1202, a person information storage 1203, and an output module 1204. Similar constituent components in the first embodiment will be assigned the same reference numerals, and explanation therefor will be omitted.

In correction performed by the correction module 107, basically the same processing as the first embodiment is performed. In the second embodiment, in order to be used for face recognition processing, a correction method to be performed is appropriately selected in accordance with a recognition method. A correction method to be actually performed is selected out of the above-described correction methods in accordance with an embodiment, and the explanation therefor will be omitted.

The feature extraction module 1201 extracts feature information indicating a face feature with which a person can identified (hereinafter referred to as the face feature information) in person image data generated in the correction module.

The feature extraction module 1201 outputs, as the face feature information, a sequence representing each face feature. The feature extraction module 1201 according to the present embodiment, based on the coordinates of a face feature point detected by the person feature point detector (a position as a characteristic part of the face), cuts a face display area into a predetermined size and shape, and extracts its gray information as a feature amount representing the face feature. In the present embodiment, the correction module 107 may output a plurality of images in preparation for a case in which a plurality of pieces of image data are used.

The present embodiment uses the gray values of the area of m by n pixels as unprocessed information, and extracts the m×n-dimensional information as a feature vector.

The feature extraction module 1201 normalizes the feature vector and the length of the feature vector into 1 by a simple similarity method, and calculates an inner product to determine similarity representing the similarity between feature vectors. The method can be realized by using a subspace method described in "Erkki Oja translated by Hidemitsu Ogawa and Makoto Sato, "Pattern Recognition and Subspace Method," Sangyo Tosho (1986)." Alternatively, the feature extraction module 1201 may adopt a method for improving precision by generating image data with the direction and condition of a face fluctuated intentionally by using a model for one piece of face image information, the method described in Japanese Patent Application Laid-open No. 2007-4767 "Tatsuo Kosakaya, "Image Recognition Apparatus, Method, and Program". By using these methods, the face feature information can be extracted from one piece of image data.

The feature extraction module 1201 may perform recognition processing with higher precision by using a plurality of successive pieces of image data for the same person to perform calculation with moving image data. For example, the feature extraction module 1201 may use a mutual subspace method described in "Kazuhiro Fukui, Osamu Yamaguchi, and Kenichi Maeda, "Face Recognition System Using Moving Image," Technical Report of the Institute of Electronics, Information and Communication Engineers, vol. 97, No. 113, pp. 17-24 (1997)" or "Kenichi Maeda and Sadakazu Watanabe, "Pattern Matching Method with Local Structure," The Transactions of the Institute of Electronics, Information and Communication Engineers (D), vol. J68-D, No. 3, pp.

345-352 (1985)." When using the mutual subspace method described in these documents, the person feature point detector 106 cuts image data with m x n pixels out of image data subjected to successive input processing by the image input processor 104, calculates the correlation matrix of the feature vectors from these pieces of image data, and determines orthonormal vectors by the K-L expansion, thereby calculating a subspace representing face feature information obtained by the successive image data.

The subspace calculation method determines the correlation matrix (or covariance matrix) of the feature vectors and its orthonormal vectors (eigenvectors) by the K-L expansion to calculate a subspace. The subspace is represented by a set of k selected eigenvectors corresponding to eigenvalues selected in descending order of the magnitude of eigenvalue. In the present embodiment, a correlation matrix Cd is determined from the feature vectors and is diagonalized as Cd=ΦdΛdΦdT to determine the matrix Φ of the eigenvector. The matrix Φ of the eigenvector is a subspace representing the feature of the face of a person being recognized. The present embodiment defines the subspace as the face feature information of a person detected from input image data.

The person information storage 1203 manages face feature information registered in advance for each person. The person information storage 1203 is a database to be used when the recognition module 1202, which will be described later, performs recognition processing of a person. The person information storage 1203 according to the present embodiment stores therein, for each person to be searched for, identification information (person ID or name) of a person, the face feature information extracted by the feature extraction module 1201, and attribute information such as the person's sex, age, and height, all correlated with each other.

The face feature information extracted by the feature extraction module 1201 to be managed may be m×n feature vectors, a subspace, or a correlation matrix immediately before the KL expansion is performed on it. Furthermore, collective management of the face feature information extracted by the feature extraction module 1201 and the image data input by the image input processor 104 simplifies person search and display of search.

The recognition module 1202, based on the face feature information extracted by the feature extraction module 1201 and the face feature information stored in the person information storage 1203, recognizes whether a person included in the image data input from the image input processor 104 is a person identified by a person ID stored in the person information storage 1203. The recognition module 1202 according to the present embodiment extracts the face feature information stored in the person information storage 1203 that resembles the face feature information extracted by the feature extraction module 1201, and recognizes the person indicated by the extracted face feature information as a candidate captured by the security camera 150.

The present embodiment describes an example in which authentication is performed using the feature information extracted by the feature extraction module 1201. The feature information is information generated by performing correction or the like based on the feature point detected by the person feature point detector 106. While the present embodiment is not limited to the authentication by the feature information based on the feature point, authentication may be performed using the unprocessed feature point.

The recognition module 1202 according to the present embodiment calculates the similarity between the face feature information extracted by the feature extraction module 1201 and the face feature information stored in the person information storage 1203 to output information on the person represented by the face feature information to the output module 1204 in a descending order of the face feature information with higher similarity.

The recognition module 1202 outputs, as a processing result, information representing the person ID correlated with the face identification information and the calculated similarity in descending order from the face identification information with higher similarity. The recognition module 1202 may output a variety of other information on the person correlated with the person ID.

The recognition module 1202 acquires the face feature point detection method used by the person feature point detector 106 from the person feature point detector 106 through the feature extraction module 1201, upon correlating the method with the face feature information extracted by the feature extraction module 1201. The recognition module 1202 outputs the acquired face feature point detection method and the face feature information detected by the method, both correlated with each other, to the output module 1204 in correlation.

The information indicating similarity according to the present embodiment is the similarity between subspaces managed as the face feature information. The similarity can be calculated in a method such as the subspace method or the multiple similarity method. These calculation methods represent the face feature information stored in the person information storage 1203 and the face feature information extracted by the feature extraction module 1201 as subspaces. The present embodiment defines the "angle" between the two subspaces as the similarity. The recognition module 1202 determines a correlation matrix Cin using the two subspaces and diagonalizes it as Cin=ΦinΛinΦinT to calculate an eigenvector Φin. The recognition module 1202 then determines the inter-subspace similarity of the two subspaces represented by Φin and ΦinT (0.0 to 1.0), and defines this as the similarity for recognition. Specifically, this calculation method may be, for example, the method described in "Erkki Oja translated by Hidemitsu Ogawa and Makoto Sato, "Pattern Recognition and Subspace Method," Sangyo Tosho (1986)". A plurality of face images that are recognized as the same person may be collectively projected onto a subspace in advance to identify whether a person is the person, thereby improving precision. For high-speed searching, a search method using the TREE structure may be used.

The output module 1204 displays the authentication result performed by the recognition module 1202 and the image data corrected by the correction module 107 on the screen. The output module 1204 may perform real-time face search result display of displaying in real time a result that matches a designated condition out of the results searched for by the recognition module 1202. The output module 1204 may perform off-line face search result display, in which the results searched for by the recognition module 1202 are stored as search histories, and conditions are designated later to display only the search history concerned. Display of both incorporated may be performed.

The present embodiment, when displaying history images and search results, displays image data corrected by the correction module 107, thereby, as in the first embodiment, displaying image data that is easy for a user to visually check.

The above-described embodiment, when determining whether a person is a specific person or searching for a similar face using a person image detected from image data captured by the security camera 150 or the like, can efficiently perform generation of image data that facilitates human visual checking in accordance with the condition of a subject and image correction required for recognition processing.

In the above-described embodiment, generation of person image data subjected to correction processing using a plurality of pieces of image data enables generation of image data that facilitates human visual checking or authentication processing.

Figure 13:
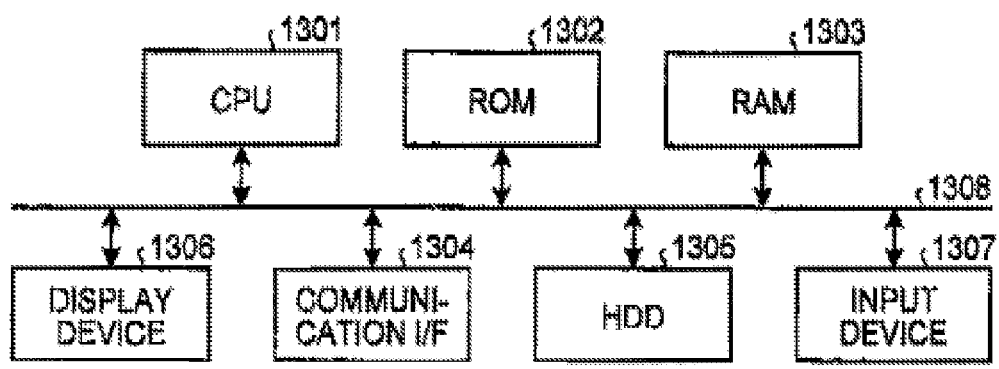
FIG. 13 is an exemplary diagram illustrating the hardware structure of a person image processing apparatus in the embodiment.

FIG. 13 is a diagram illustrating the hardware structure of the person image processing apparatuses 100 and 1200 according to the above-described embodiment. As illustrated in FIG. 13, the person image processing apparatuses 100 and 1200 comprise a CPU 1301, a read-only memory (ROM) 1302, a random access memory (RAM) 1303, a communication I/F 1304, an HDD 1305, a display device 1306, input devices 1307 such as a keyboard and a mouse, and a bus 1308 connecting those, and is a hardware structure using a normal computer.

Person image processing programs to be run on the person image processing apparatuses 100 and 1200 of the present embodiments is recorded and provided in a computer-readable recording medium such as a CD-ROM, a flexible disk (FD), a CD-R, and a digital versatile disk (DVD) as an instable or executable file.

Furthermore, the person image processing programs to be run on the person image processing apparatuses 100 and 1200 of the present embodiments may be configured to be stored on a computer that is connected to a network such as the Internet and provided through download through the network. The programs to be run on the person image processing apparatuses 100 and 1200 of the present embodiments may be configured to be provided or distributed through a network such as the Internet.

The person image processing programs to be run on the person image processing apparatuses 100 and 1200 of the present embodiments may be configured to be incorporated into a ROM or the like in advance and provided.

The person image processing programs to be run on the person image processing apparatuses 100 and 1200 of the present embodiments is a module configuration including the above-described constituent components. As actual hardware, the CPU 1301 reads out a face recognition program from the above-described medium and runs it, thereby allowing the above-described constituent components to be loaded into the RAM 1303 and allowing the above-described constituent components to be generated on the RAM 1303.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A person image processing apparatus comprising:
a first standard storage that stores therein first standard information indicating a standard for determining whether a part of a person is displayed in the image data based on a face direction of a person displayed in the image data, and;
at least one processor
that inputs a plurality of pieces of image data captured at different times by an image capture module,
that extracts a person display area showing a same person from each of the pieces of image data captured at the different times,
that detects a feature point showing a feature of a part of a person from the person display area extracted from each of the pieces of image data, detect the face direction of the person included in the person display area and acquire reliability of the part shown in the feature point based on the face direction and the first standard information, the reliability of the part being adjusted based on whether the part included or not in the person display area due to the face direction, and
that performs, when performing a correlation of the feature points included in the person display areas of the pieces of image data based on the reliability and generating person image data showing the same person using the correlation, weighting based on the reliability of the feature point included in the person display area.

2. A person image processing apparatus comprising:
a second standard storage that stores therein second standard information indicating a standard for determining whether a portion of a face of the person displayed in the image data is concealed by an object;
at least one processor
that inputs a plurality of pieces of image data captured at different times by an image capture module,
that extracts a person display area showing a same person from each of the pieces of image data captured at the different times,
that detects a feature point showing a feature of a part of a person from the person display area extracted from each of the pieces of image data, determine whether the portion of the face is concealed by an object based on the second standard information with respect to the person display area and then acquire reliability of the feature point based on a determination result; and
that performs, when performing a correlation of the feature points included in the person display areas of the pieces of image data based on the reliability and generating person image data showing the same person using the correlation, weighting based on the reliability of the feature point included in the person display area.

3. The person image processing apparatus of claim 2, wherein the at least one processor replaces, when generating the person image data showing the same person from the person display areas of the pieces of image data, for the area of the portion of the face of the person determined to be concealed, the area determined to be concealed with an interpolation image using a brightness pattern obtained by statistical learning.

4. The person image processing apparatus of claim 1, wherein the at least one processor performs, when the person display areas extracted from the pieces of image data have different resolutions, reduction or enlargement on one of the person display areas to match the resolutions and combine the person display areas.

5. The person image processing apparatus of claim 4, wherein the at least one processor uses, when matching the resolutions of the person display areas of the pieces of image data and combining the person display areas, the resolutions of the person display areas as weighting.

6. The person image processing apparatus of cllaim 1, wherein the at least one processor combines, when combining the person image data, perform the correlation of the feature points indicating a same part out of the feature points included in the person display areas, the person image data in accordance with a predetermined three-dimensional person shape model, and correct a direction of a person displayed in accordance with the three-dimensional shape model.

7. The person image processing apparatus of claim 1, wherein the at least one processor performs, when combining the person image data, sharpening processing or noise reduction processing using the person display areas.

8. The person image processing apparatus of claim 1, the at least one processor performs resolution enhancement processing using the pieces of image data or contrast correction processing using the pieces of image data.

9. The person image processing apparatus of claim 1, further comprising:
- a person storage that stores therein identification information of a person and information on the feature point showing the feature of the part of the person in correlation with each other; and
- the at least one processor recognizes whether a person is a person identified by the identification information stored in the person storage based on the information on the feature point stored in the person storage and the feature point detected by the feature detector.

10. A person image processing method comprising:
- storing, by an a first standard storage, therein first standard information indicating a standard for determining whether a part of a person is displayed in the image data based on a face direction of a person displayed in the image data;
- inputting, by an input processor, a plurality of pieces of image data captured at different times by an image capture module;
- extracting, by an extraction module, a person display area showing a same person from each of the pieces of image data captured at the different times;
- detecting, by a feature detector, a feature point showing a feature of a part of a person from the person display area extracted from each of the pieces of image data, detect the face direction of the person included in the person display area and then acquire reliability of the part shown in the feature point based on the face direction and the first standard, the reliability of the part being adjusted based on whether the part included or not in the person display area due to the face direction; and
- performing, by a correction module, when performing a correlation of the feature points included in the person display areas of the pieces of image data based on the reliability and generating person image data showing the same person using the correlation, weighting based on the reliability of the feature point included in the person display area.

\* \* \* \* \*